United States Patent
Kuboyama et al.

(10) Patent No.: US 8,773,876 B2
(45) Date of Patent: Jul. 8, 2014

(54) THREE-LEVEL INVERTER, POWER CONDITIONER, AND POWER GENERATING SYSTEM

(75) Inventors: Takashi Kuboyama, Fukuoka (JP); Katsutoshi Yamanaka, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 563 days.

(21) Appl. No.: 13/172,804

(22) Filed: Jun. 29, 2011

(65) Prior Publication Data

US 2012/0002454 A1   Jan. 5, 2012

(30) Foreign Application Priority Data

Jun. 30, 2010   (JP) .............................. P. 2010-149707

(51) Int. Cl.
*H02M 7/53862*   (2007.01)
*H02M 7/5387*   (2007.01)

(52) U.S. Cl.
USPC ........................................... 363/98; 363/132

(58) Field of Classification Search
USPC .................................... 363/17, 56.02, 98, 132
See application file for complete search history.

(56) References Cited

U.S. PATENT DOCUMENTS

| | | | | |
|---|---|---|---|---|
| 6,490,185 B1 * | 12/2002 | Yamanaka et al. | ............... | 363/98 |
| 7,558,094 B2 * | 7/2009 | Inoshita et al. | ............... | 363/132 |
| 8,228,699 B2 * | 7/2012 | Iwata et al. | .................... | 363/132 |
| 2002/0141212 A1 * | 10/2002 | Ishida et al. | .................... | 363/98 |
| 2004/0057262 A1 | 3/2004 | Tanaka et al. | | |

FOREIGN PATENT DOCUMENTS

JP   2002-176784   6/2002

* cited by examiner

*Primary Examiner* — Gary L Laxton
(74) *Attorney, Agent, or Firm* — Mori & Ward, LLP (57) ABSTRACT

A three-level inverter includes a set of series-connected capacitors connected in parallel to a direct-current power supply; two arms connected in parallel to an output of the direct-current power supply and each having an alternating-current output terminal; and a control section having a neutral voltage controller determining a three-phase voltage correction command based on a neutral voltage and voltage of the direct-current power supply, having a coordinate converter converting the three-phase voltage correction command to a voltage correction command on d-q axis, and suppressing voltage variations at the neutral point by correcting a voltage command on d-q axis based on the d-q voltage correction command. The neutral point is connected to one grounded phase of a three-phase grounded power system. The alternating-current output terminals are connected to respective non-grounded phases of the power system. A power conditioner includes the three-level inverter. A power generating system includes the power conditioner.

8 Claims, 4 Drawing Sheets

THREE-LEVEL INVERTER, POWER CONDITIONER, AND POWER GENERATING SYSTEM

CROSS-REFERENCE TO RELATED APPLICATION

The present application claims priority under 35 U.S.C. §119 to Japanese Patent Application No. 2010-149707, filed Jun. 30, 2010. The contents of this application are incorporated herein by reference in their entirety.

BACKGROUND OF THE INVENTION

1. Field of the Invention

The present invention relates to a three-level inverter in which one phase of an output thereof is grounded, a power conditioner, and a power generating system.

2. Discussion of the Background

Japanese Unexamined Patent Application Publication No. 2002-176784 discloses a neutral voltage controller included in a three-level inverter. The neutral voltage controller described in this document controls a voltage (neutral voltage) between a connecting point (neutral point) of two capacitors connected in series between a positive bus and a negative bus of the three-level inverter and the negative bus. When the neutral voltage varies, a direct-current component is superimposed on an output current.

In the three-level inverter including the neutral voltage controller described in this document, none of the U-phase, V-phase, and W-phase is grounded. The three-level inverter has three arms, a U-phase arm, a V-phase arm, and a W-phase arm, each of which outputs a voltage of each phase. Therefore, a calculator included in this three-level inverter is capable of directly generating a neutral-voltage control command in a fixed coordinate system, controlling an arm that outputs a neutral voltage on the basis of the generated neutral-voltage control command, and suppressing variations in neutral voltage.

SUMMARY OF THE INVENTION

According to one aspect of the present invention, a three-level inverter includes a first capacitor connected at one terminal to a positive side of a direct-current power supply; a second capacitor connected at one terminal to a negative side of the direct-current power supply; a set of series-connected capacitors having the first capacitor and the second capacitor connected to each other at the other terminals thereof, the set of series-connected capacitors having a connecting point of the first and second capacitors as a neutral point, which is connected to one grounded phase of a three-phase grounded power system; a first arm and a second arm connected in parallel to an output of the direct-current power supply, connected also to respective non-grounded phases of the three-phase grounded power system, and each having an alternating-current output terminal that outputs voltages of three levels, a voltage on the positive side of the direct-current power supply, a voltage on the negative side of the direct-current power supply, and a voltage at the neutral point; and a control section having a neutral voltage controller that determines a three-phase voltage correction command on the basis of the voltage at the neutral point and a voltage of the direct-current power supply, having also a coordinate converter that converts the three-phase voltage correction command to a voltage correction command on a d-q axis, and suppressing variations in voltage at the neutral point by correcting a voltage command on the d-q axis on the basis of the voltage correction command on the d-q axis.

According to another aspect of the present invention, a power conditioner includes a step-up converter configured to step up a direct voltage, and a three-level inverter. The three-level inverter includes (1) a set of series-connected capacitors having a first capacitor connected at one terminal to a positive side of an output of the step-up converter and a second capacitor connected at one terminal to a negative side of the output of the step-up converter, wherein the first capacitor and the second capacitor are connected to each other at the other terminals thereof, and the set of series-connected capacitors has a connecting point of the first and second capacitors as a neutral point, which is connected to one grounded phase of a three-phase grounded power system; (2) a first arm and a second arm connected in parallel to the output of the step-up converter, connected also to respective non-grounded phases of the three-phase grounded power system, and each having an alternating-current output terminal that outputs voltages of three levels, a voltage on the positive side of the output, a voltage on the negative side of the output, and a voltage at the neutral point; and (3) a control section having a neutral voltage controller that determines a three-phase voltage correction command on the basis of the amount of error of the voltage at the neutral point, having also a coordinate converter that converts the three-phase voltage correction command to a voltage correction command on a d-q axis, and suppressing variations in voltage at the neutral point by correcting a voltage command on the d-q axis on the basis of the voltage correction command on the d-q axis.

According to a further aspect of the present invention, a power generating system includes a power generator configured to output a direct voltage, a step-up converter configured to step up the direct voltage, and a three-level inverter. The three-level inverter includes (1) a set of series-connected capacitors having a first capacitor connected at one terminal to a positive side of an output of the step-up converter and a second capacitor connected at one terminal to a negative side of the output of the step-up converter, wherein the first capacitor and the second capacitor are connected to each other at the other terminals thereof, and the set of series-connected capacitors has a connecting point of the first and second capacitors as a neutral point, which is connected to one grounded phase of a three-phase grounded power system; (2) a first arm and a second arm connected in parallel to the output of the step-up converter, connected also to respective non-grounded phases of the three-phase grounded power system, and each having an alternating-current output terminal that outputs voltages of three levels, a voltage on the positive side of the output, a voltage on the negative side of the output, and a voltage at the neutral point; and (3) a control section having a neutral voltage controller that determines a three-phase voltage correction command on the basis of the amount of error of the voltage at the neutral point, having also a coordinate converter that converts the three-phase voltage correction command to a voltage correction command on a d-q axis, and suppressing variations in voltage at the neutral point by correcting a voltage command on the d-q axis on the basis of the voltage correction command on the d-q axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

Figure 1:
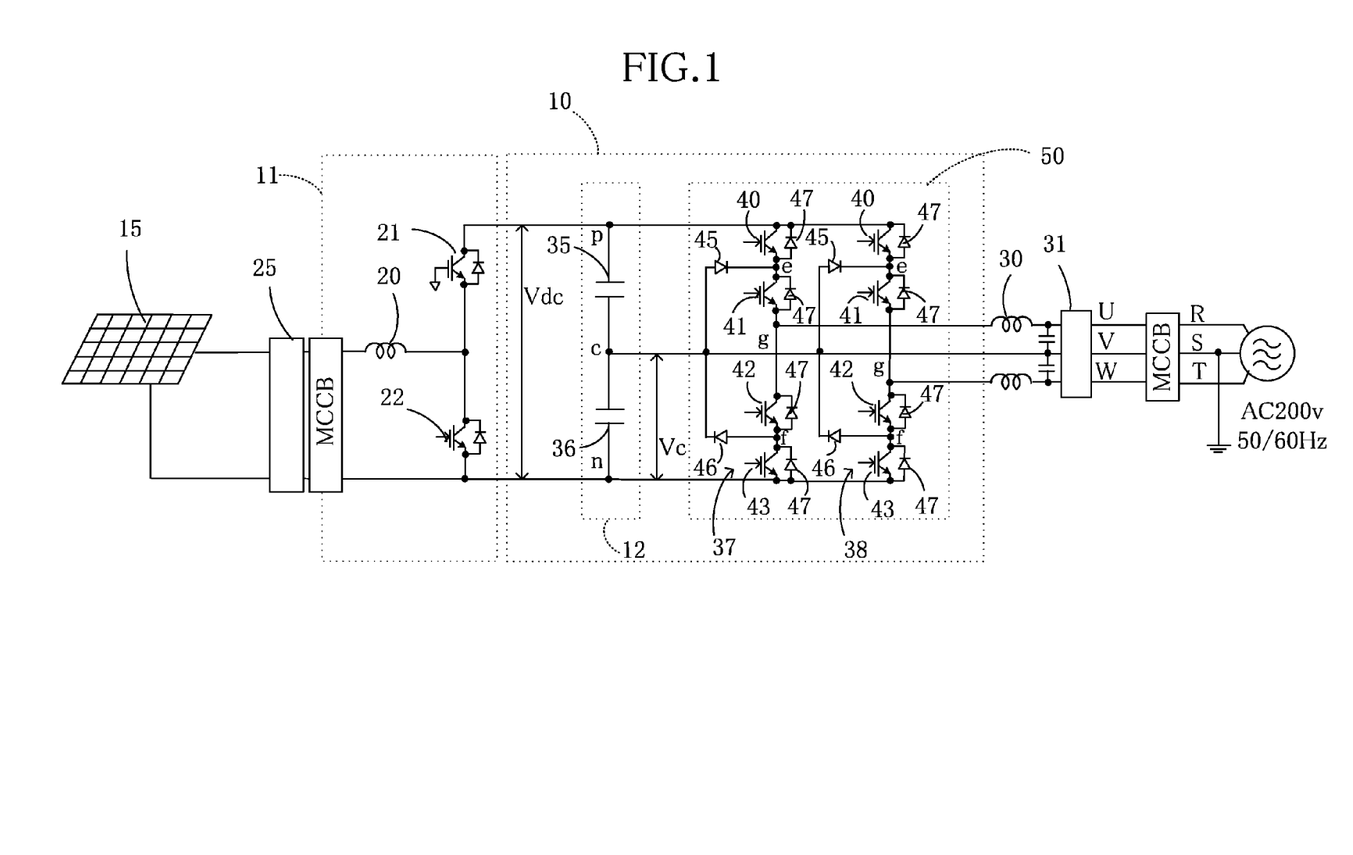
FIG. 1 illustrates a three-level inverter according to an embodiment of the present invention.

As illustrated in FIG. 1, a three-level inverter 10 according to an embodiment of the present invention includes a set of series-connected capacitors 12 that has a first smoothing capacitor 35 and a second smoothing capacitor 36 connected in series, and a power converter 50 that outputs voltages of three different levels. Note that FIG. 1 illustrates only part of a configuration of the three-level inverter 10.

Referring to FIG. 1, a step-up chopper (an example of a step-up converter) 11 is connected to a solar panel (an example of a power generator) 15. The solar panel 15 receives sunlight and outputs, for example, a direct voltage of 100 V to 600 V.

The step-up chopper 11 steps up the direct voltage output by the solar panel 15. The stepped-up output voltage is, for example, 700 V. The step-up chopper 11 includes at least a reactor 20 and semiconductor switching elements 21 and 22. The direct voltage output by the solar panel 15 is input via a filter 25 and a molded case circuit breaker (MCCB) to the step-up chopper 11. The filter 25 and the MCCB are provided as necessary depending on the application of the three-level inverter 10 of the present embodiment. That is, the present embodiment is unrelated to the presence of the filter 25 and the MCCB. The solar panel 15, the filter 25, the MCCB, and the step-up chopper 11 constitute an example of a direct-current power supply.

The three-level inverter 10 converts the direct-current power output by the step-up chopper 11 into three-phase alternating power of the U-phase, V-phase, and W-phase. The three-phase alternating power is supplied to a power system. In the example of FIG. 1, the U-phase, V-phase, and W-phase at the output of the three-level inverter 10 are connected to the R-phase, S-phase, and T-phase, respectively, on the side of the power system.

The set of series-connected capacitors 12 having the first smoothing capacitor 35 and the second smoothing capacitor 36 connected in series is provided on the input side of the three-level inverter 10. The first smoothing capacitor 35 is connected to the positive side (point p in FIG. 1) of a direct-current voltage $V_{dc}$ output by the step-up chopper 11, while the second smoothing capacitor 36 is connected to the negative side (point n in FIG. 1) of the direct voltage $V_{dc}$ output by the step-up chopper 11. The direct voltage $V_{dc}$ input to the three-level inverter 10 is reduced by the first smoothing capacitor 35 and the second smoothing capacitor 36 at a neutral point c (i.e., a connecting point of the first smoothing capacitor 35 and the second smoothing capacitor 36) to a neutral voltage $V_c$, which is substantially half the direct voltage $V_{dc}$.

Two arms, a U-phase arm (first arm) 37 that outputs a U-phase voltage and a W-phase arm (second arm) 38 that outputs a W-phase voltage, are provided on the output side of the three-level inverter 10. Each of the arms 37 and 38 includes a first semiconductor switching element 40, a second semiconductor switching element 41, a third semiconductor switching element 42, and a fourth semiconductor switching element 43, which are connected in series. A first diode 45 is connected between the neutral point c and a connecting point e of the first semiconductor switching element 40 and the second semiconductor switching element 41. The anode of the first diode 45 is connected to the neutral point c, while the cathode of the first diode 45 is connected to the connecting point e. A second diode 46 is connected between the neutral point c and a connecting point f of the third semiconductor switching element 42 and the fourth semiconductor switching element 43. The cathode of the second diode 46 is connected to the neutral point c, while the anode of the second diode 46 is connected to the connecting point f. A connecting point g of the second semiconductor switching element 41 and the third semiconductor switching element 42 serves as an alternating-current output terminal. A third diode 47 is connected in antiparallel to each of the first to fourth semiconductor switching elements 40 to 43.

The on/off timing of the first to fourth semiconductor switching elements 40 to 43 is controlled by a control section 55 (see FIG. 2) described below. As a result, voltages of three levels, that is, voltages on the positive and negative sides of the output of the step-up chopper 11 and a voltage at the neutral point c, are output from the alternating-current output terminal of each of the U-phase arm 37 and the W-phase arm 38.

The power converter 50 of the three-level inverter 10 does not include a V-phase arm that outputs a V-phase voltage. In other words, the three-level inverter 10 includes only two arms, the U-phase arm 37 and the W-phase arm 38. The V-phase is connected to the neutral point c. At the same time, the V-phase is grounded as the S-phase on the power system side.

The three-phase alternating-current power output by the three-level inverter 10 is supplied via an output filter 30, a filter 31, and an MCCB to a three-phase power system (e.g., having a voltage of 200 V and a frequency of 50/60 Hz) in which the S-phase is grounded.

Figure 2:
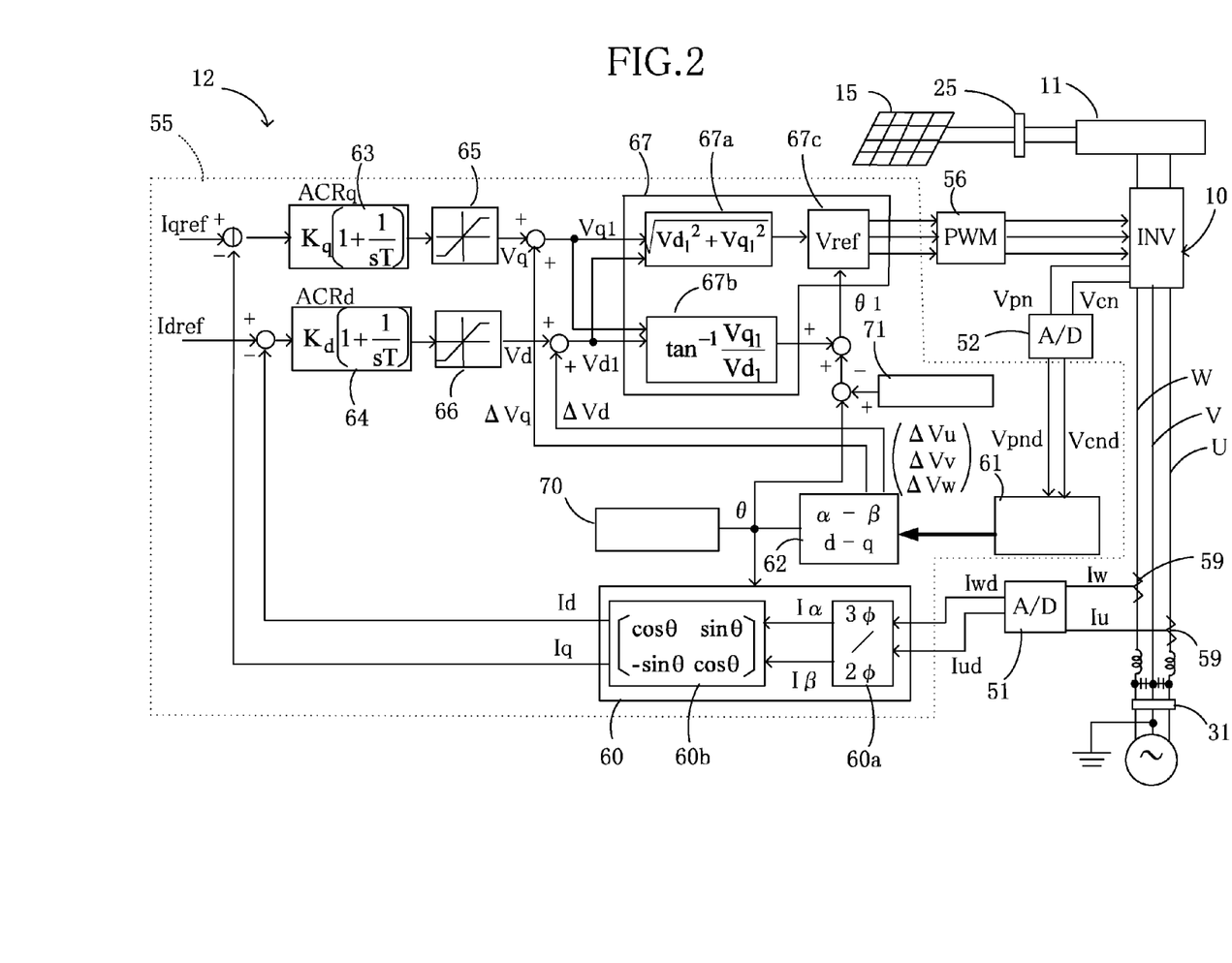
FIG. 2 is a block diagram illustrating a control section of the three-level inverter.

The three-level inverter 10 will now be described in detail. As illustrated in FIG. 2, the three-level inverter 10 includes a first analog-to-digital (A/D) converter 51, a second A/D converter 52, the control section 55, and a pulse-width modulation (PWM) signal generator 56, as well as the set of series-connected capacitors 12 and the power converter 50 described above.

In accordance with a PWM signal output by the PWM signal generator 56, the power converter 50 opens and closes each of the first semiconductor switching elements 40 (see FIG. 1) to convert the direct power output by the step-up chopper 11 to three-phase alternating power. The first A/D converter 51 A/D-converts three-phase current values $I_u$ and $I_w$ detected by current detectors 59. The second A/D converter 52 A/D-converts a direct voltage $V_{pn}$ and a neutral voltage $V_{cn}$ obtained, for example, when a voltage-dividing circuit including resistors (not shown) divides the direct-current voltage $V_{dc}$ and the neutral voltage $V_c$. The first A/D converter 51 and the second A/D converter 52 each are, for example, an A/D conversion integrated circuit (IC).

The control section 55 subtracts current values $I_{ud}$ and $I_{wd}$ output by the first A/D converter 51 from a q-axis current command value $I_{gref}$ and a d-axis current command value $I_{dref}$, respectively. On the basis of a direct voltage $V_{pnd}$ and a neutral voltage $V_{cnd}$ output by the second A/D converter 52, the control section 55 corrects a q-axis voltage command value $V_q$ and a d-axis voltage command value $V_d$ as described below. By correcting the q-axis voltage command value $V_q$ and the d-axis voltage command value $V_d$, the control section 55 generates a PWM command such that three-phase alternating-current power is output in which a direct-current component superimposed on the V-phase is suppressed. The control section 55 is implemented, for example, by software executed by a central processing unit (CPU) (not shown) included in the three-level inverter 10. The control section 55 will be described in detail later on.

In accordance with the PWM command output by the control section 55, the PWM signal generator 56 generates a PWM signal to drive the first to fourth semiconductor switching elements 40 to 43 included in the power converter 50. The PWM signal generator 56 is, for example, a PWM IC.

The control section 55 will now be described in detail. The control section 55 includes a coordinate converter 60, a neutral voltage controller 61, a coordinate converter 62, a q-axis current controller (ACRq) 63, a d-axis current controller (ACRd) 64, limiters 65 and 66, and a command calculator 67.

The coordinate converter 60 includes an α-β converter 60a and a d-q converter 60b. The α-β0 converter 60a calculates a current value $I_{vd}$ from the current values $I_{ud}$ and $I_{wd}$ output by the first A/D converter 51. A current detector 59 may also be provided for the V-phase so that the current value $I_{vd}$ can be output by the first A/D converter 51. The α-β converter 60a performs α-β conversion to convert the three-phase current values $I_{ud}$, $I_{vd}$, and $I_{wd}$ to two-phase current values. The current values $I_{ud}$, $I_{vd}$, and $I_{wd}$ are converted by α-β conversion to current values $I_\alpha$ and $I_\beta$ and output. On the basis of a phase θ of the power supply output by a phase detector 70, the d-q converter 60b performs d-q conversion on the current values $I_\alpha$ and $I_\beta$ output by the α-β converter 60a. The current values $I_\alpha$ and $I_\beta$ are converted by the d-q conversion to feedback current values $I_d$ and $I_q$ and output.

Figure 3:
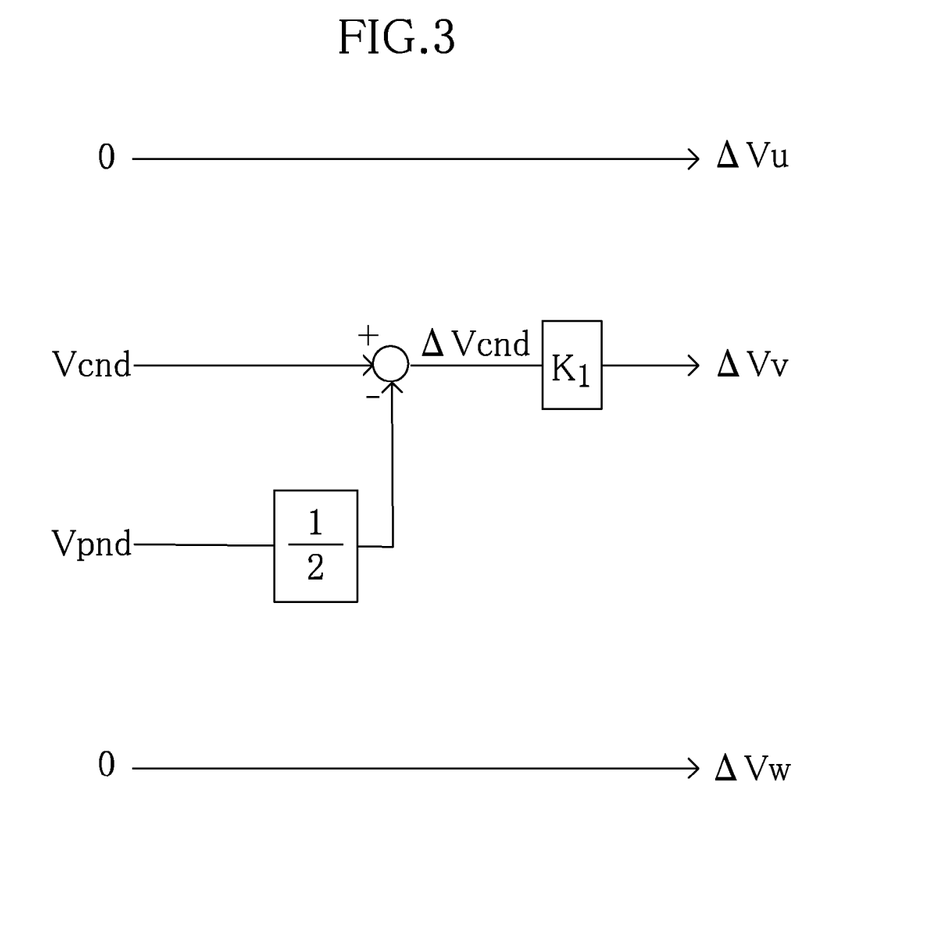
FIG. 3 is a block diagram illustrating a neutral voltage controller of the three-level inverter.

The direct-current voltage $V_{pnd}$ and the neutral voltage $V_{cnd}$ are input to the neutral voltage controller 61. From these voltage values, the neutral voltage controller 61 determines a V-phase voltage correction command value $\Delta V_v$. Specifically, from the direct-current voltage $V_{pnd}$ and the neutral voltage $V_{cnd}$, the neutral voltage controller 61 determines a error $\Delta V_{CND}$ of the neutral voltage, and multiplies the error $\Delta V_{CND}$ by an adjustment gain $K_1$ to determine the V-phase voltage correction command value $\Delta V_v$, which is a grounded-phase voltage correction command value. More specifically, as illustrated in FIG. 3, the neutral voltage controller 61 subtracts half the direct-current voltage $V_{pnd}$ from the neutral voltage $V_{cnd}$ to determine the error $\Delta V_{CND}$ of the neutral voltage, and multiplies the error $\Delta V_{CND}$ by the adjustment gain $K_1$ to determine the V-phase voltage correction command value $\Delta V_v$. Alternatively, the V-phase voltage correction command value $\Delta V_v$ may be determined by performing proportional-integral (PI) amplification on the error $\Delta V_{CND}$. The neutral voltage controller 61 determines both a U-phase voltage correction command value $\Delta V_u$ and a W-phase voltage correction command value $\Delta V_w$, which are non-grounded-phase voltage correction command values, to be zero and outputs (0, $\Delta V_v$, 0) as a three-phase voltage correction command ($\Delta V_u$, $\Delta V_v$, $\Delta V_w$).

After performing α-β conversion on the three-phase voltage correction command (0, $\Delta V_v$, 0) output by the neutral voltage controller 61, the coordinate converter 62 performs d-q conversion on the resulting command on the basis of the phase θ of the power supply output by the phase detector 70. As a result, the three-phase voltage correction command (0, $\Delta V_v$, 0) is converted to a voltage correction command ($\Delta V_d$, $\Delta V_q$) on the d-q axis.

A error between the q-axis current command value $I_{qref}$ and the feedback current value $I_q$ output by the coordinate converter 60 is input to the q-axis current controller 63. The q-axis current controller 63 controls the q-axis voltage by PI control. The output of the q-axis current controller 63 is output, via the limiter 65, as the q-axis voltage command value $V_q$. The q-axis voltage command value $V_q$ is corrected to a q-axis voltage command value $V_{q1}$ by adding the voltage correction command $\Delta V_q$ to the q-axis voltage command value $V_q$.

Similarly, a error between the d-axis current command value $I_{dref}$ and the feedback current value $I_d$ output by the coordinate converter 60 is input to the d-axis current controller 64. The d-axis current controller 64 controls the d-axis voltage by PI control. The output of the d-axis current controller 64 is output, via the limiter 66, as the d-axis voltage command value $V_d$. The d-axis voltage command value $V_d$ is corrected to a d-axis voltage command value $V_{d1}$ by adding the voltage correction command $\Delta V_d$ to the d-axis voltage command value $V_d$.

The q-axis current command value $I_{qref}$ and the d-axis current command value $I_{dref}$ are determined in various ways depending on the application of the three-level inverter 10 of the present embodiment. For example, as described in the present embodiment, when the three-level inverter 10 is included in a power conditioner that supplies power output from the solar panel 15 to the three-phase power system, the q-axis current command value $I_{qref}$ and the d-axis current command value $I_{dref}$ can be determined from the direct voltage $V_{pnd}$. Specifically, after the value of the direct voltage $V_{dc}$ (e.g., 100 V to 600 V) is set for the control section 55 by using a setting tool (not shown), the set value is converted to a value which is on the same scale as the direct voltage Vpnd. For example, if the direct voltage $V_{pnd}$ is a numerical scale value that can convert 600 V to a digital value of 10000, the set value 600 V is converted by proportional calculation to 10000. A error between the set value of the direct voltage $V_{dc}$ and the direct-current voltage $V_{pnd}$ (feedback value) is input to a PI amplifier. The output of the PI amplifier is determined to be the q-axis current command value $I_{qref}$ and the d-axis current command value $I_{dref}$ is determined to be zero. As a result, an excess or deficiency of power supply to the power system can be corrected to a level that does not cause significant variations in direct-current voltage $V_{dc}$. As described above, the way of determining the q-axis current command value $I_{qref}$ and the d-axis current command value $I_{dref}$ is not limited to this.

On the basis of (1) the q-axis voltage command value $V_{q1}$ obtained after correction, (2) the d-axis voltage command value $V_{d1}$ obtained after correction, and (3) a phase $\theta_1$ of a voltage command, the command calculator 67 generates a PWM command for the PWM signal generator 56 and outputs the generated PWM command. The phase $\theta_1$ of the voltage command is obtained by subtracting the output of a phase adjuster 71 that adjusts a phase of an output voltage from the phase θ of the three-phase power system detected by the phase detector 70, and adding a phase on the d-q coordinate axis to the resulting value. For example, when the voltage of the R-phase of the three-phase power system is a largest positive value, the phase adjuster 71 determines a value subtracted from the phase θ of the three-phase power system (i.e., an output value of the phase adjuster 71) such that the result of the subtraction is an integer multiple of 360° including 0°, and thus adjusts the phase of the output voltage.

The command calculator 67 includes a first calculator 67a, a second calculator 67b, and a third calculator 67c. The first calculator 67a calculates the magnitude of a voltage command on the basis of the q-axis voltage command value $V_{q1}$ obtained after correction and the d-axis voltage command value $V_{d1}$ obtained after correction. The second calculator 67b calculates the phase of the voltage command on the d-q coordinate axis (i.e., the phase relative to the d-axis) on the basis of the q-axis voltage command value $V_{q1}$ obtained after correction and the d-axis voltage command value $V_{d1}$ obtained after correction. The third calculator 67c generates a PWM signal which represents an on-off pattern of the first to fourth semiconductor switching elements 40 to 43 of the power converter 50, on the basis of a voltage command vector $V_{ref}$ determined by the magnitude of the voltage command and the phase $\theta_1$ of the voltage command. An example of a method for generating the PWM signal is to determine the length of time during which the first to fourth semiconductor switching elements 40 to 43 are ON such that the voltage command vector $V_{ref}$ is given constantly during a single PWM carrier period T. This method will now be specifically described with reference to FIG. 4.

Figure 4:
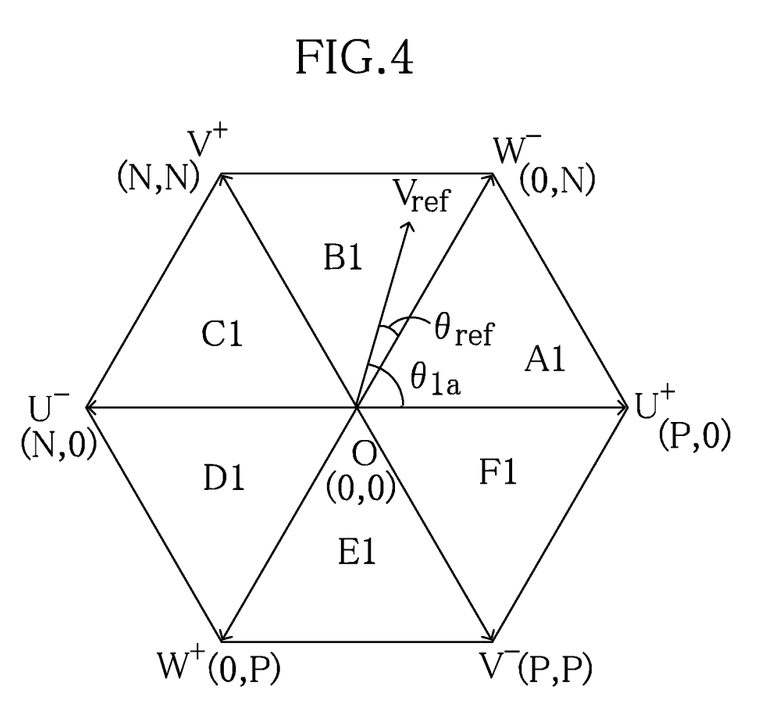
FIG. 4 is a vector diagram illustrating a relationship between a switching state of each arm of the three-level inverter and a voltage command vector.

In FIG. 4, voltage vectors $U^+$, $U^-$, $V^+$, $V^-$, $W^+$, and $W^-$ have phases that are 60° different from each other. The magnitude of the voltage vectors $U^+$, $U^-$, $V^+$, $V^-$, $W^+$, and $W^-$ is equal to half the output voltage of the step-up chopper 11 if there is no voltage variation in the first smoothing capacitor 35 and the second smoothing capacitor 36. A vector O is a zero voltage vector on the origin having a magnitude of zero. These seven vectors are voltage vectors output by the first to fourth semiconductor switching elements 40 to 43. An indication, such as (P, 0), shown with a symbol representing each vector indicates a switching state of the first to fourth semiconductor switching elements 40 to 43. This indication is referred to as a switching state indication. Of two symbols separated by a comma in a switching state indication, the first symbol (to the left of the comma) indicates a switching state of the first to fourth semiconductor switching elements 40 to 43 of the U-phase arm 37, and the second symbol (to the right of the comma) indicates a switching state of the first to fourth semiconductor switching elements 40 to 43 of the W-phase arm 38. The symbol P corresponds to a state in which a positive voltage is output from the arm, and indicates that the first and second semiconductor switching elements 40 and 41 are ON and the third and fourth semiconductor switching elements 42 and 43 are OFF. The symbol 0 corresponds to a state in which a zero voltage is output from the arm, and indicates that the second and third semiconductor switching elements 41 and 42 are ON and the first and fourth semiconductor switching elements 40 and 43 are OFF. The symbol N corresponds to a state in which a negative voltage is output from the arm, and indicates that the third and fourth semiconductor switching elements 42 and 43 are ON and the first and second semiconductor switching elements 40 and 41 are OFF. Each of the seven vectors illustrated in FIG. 4 is realized by a switching state specified by a switching state indication shown with a symbol representing the vector. A vector plane illustrated in FIG. 4 is divided into six regions A1, B1, C1, D1, E1, F1 by the six voltage vectors $U^+$, $U^-$, $V^+$, $V^-$, $W^+$, and $W^-$.

As described above, when the phase adjuster 71 adjusts the phase θ of the three-phase power system detected by the phase detector 70 to a value which is an integer multiple of 360° including 0° when the voltage of the R-phase of the three-phase power system is a largest positive value, the phase $\theta_1$ of the voltage command (see FIG. 2) is an angle formed by the voltage command vector $V_{ref}$ and the vector $U^+$ along which a largest positive voltage is output to the U-phase connected to the R-phase. From the value of the phase $\theta_1$, it is possible to easily determine which of the six regions A1, B1, C1, D1, E1, and F1 is a region in which the voltage command vector $V_{ref}$ lies. The third calculator 67c is provided with a ring counter (not shown) which is reset to 0° every time the count value reaches 360°. The phase $\theta_1$ of the voltage command is input to the ring counter, from which a phase $\theta_{1a}$ is output. If the phase $\theta_{1a}$ is greater than or equal to 0° and less than 60°, the voltage command vector $V_{ref}$ is determined to lie in the region A1. If the phase $\theta_{1a}$ is greater than or equal to 60° and less than 120°, the voltage command vector $V_{ref}$ is determined to lie in the region B1. If the phase $\theta_{1a}$ is greater than or equal to 120° and less than 180°, the voltage command vector $V_{ref}$ is determined to lie in the region C1. If the phase $\theta_{1a}$ is greater than or equal to 180° and less than 240°, the voltage command vector $V_{ref}$ is determined to lie in the region D1. If the phase $\theta_{1a}$ is greater than or equal to 240° and less than 300°, the voltage command vector $V_{ref}$ is determined to lie in the region E1. If the phase $\theta_{1a}$ is greater than or equal to 300° and less than 360°, the voltage command vector $V_{ref}$ is determined to lie in the region F1.

Each of the six regions A1, B1, C1, D1, E1, and F1 is triangular in shape. A vector lying in each of the regions A1, B1, C1, D1, E1, and F1 can be created as a time average during the single PWM carrier period T by sequentially outputting three vectors of predetermined time widths during the single PWM carrier period T, the three vectors having endpoints that coincide with three vertexes of the region. FIG. 4 illustrates a moment in which the voltage command vector $V_{ref}$ lies in the region B1. In the state of FIG. 4, three vectors O, $W^-$, and $V^+$ are used. The length of time during which the vector O is output is denoted by $T_1$, the length of time during which the vector $W^-$ is output is denoted by $T_2$, and the length of time during which the vector $V^+$ is output is denoted by $T_3$. The values of $T_1$, $T_2$, and $T_3$ can be determined from a condition in which a voltage vector $V_{mean}$ created as a time average during the single PWM carrier period T coincides with the voltage command vector $V_{ref}$. A component of the voltage vector $V_{mean}$ parallel to the voltage command vector $V_{ref}$ is the magnitude of the voltage command vector $V_{ref}$, $|V_{ref} \cdot T|$, and a component of the voltage vector $V_{mean}$ perpendicular to the voltage command vector $V_{ref}$ is zero. Thus, the following equations (1) to (3) hold true:

$$(V_{pnd}/2)T_2 \cos\theta_{ref} + (V_{pnd}/2)T_3 \cos(60°-\theta_{ref}) = |V_{ref} \cdot T| \quad \text{Equation (1)}$$

$$-(V_{pnd}/2)T_2 \sin\theta_{ref} + (V_{pnd}/2)T_3 \sin(60°-\theta_{ref}) = 0 \quad \text{Equation (2)}$$

$$T_1 + T_2 + T_3 = T \quad \text{Equation (3)}$$

where $\theta_{ref}$ can be obtained by $\theta_{1a}-60°$ in the region B1 (see FIG. 4). Similarly, $\theta_{ref}$ can be obtained by $\theta_{1a}-0°$ in the region A1, by $\theta_{1a}-120°$ in the region C1, by $\theta_{1a}-180°$ in the region D1, by $\theta_{1a}-240°$ in the region E1, and by $\theta_{1a}-300°$ in the region F1. By determining $T_1$, $T_2$, and $T_3$ by solving equations (1) to (3), the third calculator 67c calculates a pulse width of a PWM signal and outputs a PWM command to the PWM signal generator 56.

Next, a method for controlling the neutral voltage $V_c$ of the three-level inverter 10 according to the present embodiment will be described.

The direct-current voltage $V_{pnd}$ and the neutral voltage $V_{cnd}$ are input to the neutral voltage controller 61. From these voltage values, the neutral voltage controller 61 determines the three-phase voltage correction command ($\Delta V_u$, $\Delta V_v$, $\Delta V_w$) on the basis of the following equations (4) to (6):

$$\Delta V_u = 0 \quad \text{Equation (4)}$$

$$\Delta V_v = K_1(V_{cnd} - \tfrac{1}{2} * V_{pnd}) \quad \text{Equation (5)}$$

$$\Delta V_w = 0 \quad \text{Equation (6)}$$

where $K_1$ is an adjustment gain as described above.

The three-phase voltage correction command ($\Delta V_u$, $\Delta V_v$, $\Delta V_w$) calculated by the neutral voltage controller 61 is coordinate-converted (through α-β conversion and d-q conversion) by the coordinate converter 62 to the voltage correction command ($\Delta V_d$, $\Delta V_q$) on the d-q axis. The values of the resulting voltage correction command ($\Delta V_d$, $\Delta V_q$) are added to the q-axis voltage command value $V_q$ and the d-axis voltage command value $V_d$ and act to suppress variations in neutral voltage $V_c$. As a result, a direct-current component superimposed on the output current is suppressed.

In the embodiment described above, the q-axis voltage command value $V_q$ and the d-axis voltage command value $V_d$ are corrected with the voltage correction commands $\Delta V_q$ and $\Delta V_d$ at a position downstream of the limiters 65 and 66, respectively. Alternatively, the q-axis voltage command value $V_q$ may be corrected with the voltage correction command $\Delta V_q$ at a position between the q-axis current controller 63 and the limiter 65, and the d-axis voltage command value $V_d$ may be corrected with the voltage correction command $\Delta V_d$ at a position between the d-axis current controller 64 and the limiter 66.

The solar panel 15 may be replaced with any power generator that outputs direct-current power, or with a combination of such a power generator and a rectifier. Examples of the power generator include a wind power generator and a fuel-cell power generator. The step-up chopper 11 may be included in such a power generator.

The names U-phase, V-phase, and W-phase representing three phases and the names R-phase, S-phase, and T-phase also representing three phases are merely used in accordance with practices and not limited to them.

A power generating system includes a power generator, a step-up converter, and the three-level inverter 10 described above. A power conditioner includes a step-up converter and the three-level inverter 10 described above.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A three-level inverter comprising:
    a first capacitor connected at one terminal to a positive side of a direct power supply;
    a second capacitor connected at one terminal to a negative side of the direct power supply;
    a set of series-connected capacitors having the first capacitor and the second capacitor connected to each other at the other terminals thereof, the set of series-connected capacitors having a connecting point of the first and second capacitors as a neutral point, which is connected to one grounded phase of a three-phase grounded power system;
    a first arm and a second arm connected in parallel to an output of the direct-current power supply, connected also to respective non-grounded phases of the three-phase power system, and each having an alternating-current output terminal that outputs voltages of three levels, a voltage on the positive side of the direct-current power supply, a voltage on the negative side of the direct-current power supply, and a voltage at the neutral point; and
    a control section having a neutral voltage controller that determines a three-phase voltage correction command on the basis of the voltage at the neutral point and a voltage of the direct-current power supply, having also a coordinate converter that converts the three-phase voltage correction command to a voltage correction command on a d-q axis, and suppressing variations in voltage at the neutral point by correcting a voltage command on the d-q axis on the basis of the voltage correction command on the d-q axis.

2. The three-level inverter according to claim 1, wherein each of the first and second arms has first, second, third, and fourth semiconductor switching elements connected in series,
    a first diode connected between a connecting point of the first and second semiconductor switching elements and the neutral point, and
    a second diode connected between a connecting point of the third and fourth semiconductor switching elements and the neutral point; and
    a connecting point of the second and third semiconductor switching elements is the alternating-current output terminal.

3. The three-level inverter according to claim 1, wherein components of the non-grounded phases of the three-phase voltage correction command are zero, and a component of the grounded phase of the three-phase voltage correction command is determined on the basis of the voltage at the neutral point and the voltage of the direct-current power supply.

4. The three-level inverter according to claim 3, wherein the component of the grounded phase of the three-phase voltage correction command is determined by calculating a error of the voltage at the neutral point from a direct voltage output by the direct-current power supply and the voltage at the neutral point, and multiplying the error by an adjustment gain.

5. The three-level inverter according to claim 3, wherein the component of the grounded phase of the three-phase voltage correction command is determined by calculating a error of the voltage at the neutral point from a direct voltage output by the direct-current power supply and the voltage at the neutral point, and performing proportional-integral amplification on the error.

6. The three-level inverter according to claim 3, wherein the component of the grounded phase of the three-phase voltage correction command is determined on the basis of a error between half a direct voltage output by the direct-current power supply and the voltage at the neutral point.

7. A power conditioner comprising:
    a step-up converter configured to step up a direct voltage; and
    a three-level inverter including
        (1) a set of series-connected capacitors having a first capacitor connected at one terminal to a positive side of an output of the step-up converter and a second capacitor connected at one terminal to a negative side of the output of the step-up converter, wherein the first capacitor and the second capacitor are connected to each other at the other terminals thereof, and the set of series-connected capacitors has a connecting point of the first and second capacitors as a neutral point, which is connected to one grounded phase of a three-phase grounded power system,
        (2) a first arm and a second arm connected in parallel to the output of the step-up converter, connected also to respective non-grounded phases of the three-phase grounded power system, and each having an alternating-current output terminal that outputs voltages of three levels, a voltage on the positive side of the output, a voltage on the negative side of the output, and a voltage at the neutral point, and
        (3) a control section having a neutral voltage controller that determines a three-phase voltage correction command on the basis of the amount of error of the voltage at the neutral point, having also a coordinate converter that converts the three-phase voltage correction command to a voltage correction command on a d-q axis, and suppressing variations in voltage at the neutral point by correcting a voltage command on the d-q axis on the basis of the voltage correction command on the d-q axis.

8. A power generating system comprising:

a power generator configured to output a direct voltage;

a step-up converter configured to step up the direct voltage; and a three-level inverter including (1) a set of series-connected capacitors having a first capacitor connected at one terminal to a positive side of an output of the step-up converter and a second capacitor connected at one terminal to a negative side of the output of the step-up converter, wherein the first capacitor and the second capacitor are connected to each other at the other terminals thereof, and the set of series-connected capacitors has a connecting point of the first and second capacitors as a neutral point, which is connected to one grounded phase of a three-phase grounded power system, (2) a first arm and a second arm connected in parallel to the output of the step-up converter, connected also to respective non-grounded phases of the three-phase power system, and each having an alternating-current output terminal that outputs voltages of three levels, a voltage on the positive side of the output, a voltage on the negative side of the output, and a voltage at the neutral point, and (3) a control section having a neutral voltage controller that determines a three-phase voltage correction command on the basis of the amount of error of the voltage at the neutral point, having also a coordinate converter that converts the three-phase voltage correction command to a voltage correction command on a d-q axis, and suppressing variations in voltage at the neutral point by correcting a voltage command on the d-q axis on the basis of the voltage correction command on the d-q axis.

* * * * *